United States Patent [19]

Johnson

[11] Patent Number: 4,532,054
[45] Date of Patent: Jul. 30, 1985

[54] POLYETHERIMIDE BEARING COMPOSITIONS

[75] Inventor: Robert O. Johnson, Marietta, Ga.

[73] Assignee: General Electric Company, Pittsfield, Mass.

[21] Appl. No.: 626,728

[22] Filed: Jul. 2, 1984

Related U.S. Application Data

[63] Continuation-in-part of Ser. No. 454,064, Dec. 28, 1982, abandoned.

[51] Int. Cl.$^3$ .................. C10M 7/16; C10M 7/30
[52] U.S. Cl. ..................... 252/12.4; 252/12; 252/12.2; 252/29; 252/51.5 A
[58] Field of Search ............ 252/12, 12.2, 12.4, 252/51.5 A, 29

[56] References Cited

U.S. PATENT DOCUMENTS

| | | | |
|---|---|---|---|
| 3,629,103 | 12/1971 | Korshak et al. | 252/12 |
| 3,693,086 | 9/1972 | Reclecker et al. | 252/12 |
| 3,803,085 | 4/1974 | Kocharowski | 528/170 |
| 3,847,867 | 11/1974 | Heath et al. | 524/233 |
| 3,847,869 | 11/1974 | Williams, III | 524/233 |
| 3,850,885 | 11/1974 | Takekoski et al. | 524/233 |
| 3,852,242 | 12/1974 | White | 528/170 |
| 3,855,178 | 12/1974 | White et al. | 528/170 |
| 4,049,613 | 9/1977 | White | 524/495 |

*Primary Examiner*—Jacqueline V. Howard
*Attorney, Agent, or Firm*—Bernard, Rothwell & Brown

[57] ABSTRACT

Nonmetallic bearing compositions contain a polyetherimide resin and, as modifiers and reinforcements, a fluoropolymer, such as polytetrafluoroethylene, a lubricating agent selected from the group consisting of molybdenum disulfide, graphite or a silicone fluid, molybdenum disulfide-containing lubricant or any mixture thereof, and a reinforcing agent selected from the group consisting of glass fibers, carbon fibers and glass beads. The present compositions can be fabricated into a variety of shapes by injection molding, and have excellent wear resistance, load-bearing capabilities, and low coefficients of friction without the use of external lubrication.

15 Claims, No Drawings

POLYETHERIMIDE BEARING COMPOSITIONS

This application is a continuation-in-part of U.S. Ser. No. 454,064, filed Dec. 28, 1982, now abandoned.

BACKGROUND OF THE INVENTION

The present invention relates to novel non-metallic bearing compositions. More particularly, the invention relates to polyetherimide-based non-metallic bearing compositions.

Virtually all machinery which contains moving parts utilizes bearings to reduce wear between stationary and moving components. The most common types of bearings are roller bearings, which employ balls or needles retained by a cage with an inner and outer race. These bearings are relatively complex, require considerable lubrication and are noisy. They are also relatively bulky and heavy, which precludes their use in certain applications.

Alternatives to roller bearings are journal bearings or bushings and thrust washers. When these types of bearings are made of metal, lubrication is required, and in the event of a loss of lubrication, failure is usually catastrophic. Also, start-up wear and noise levels can be high. Moreover, the relatively high weights of these bearings can be disadvantageous, particularly in transportation applications.

One approach to overcoming many of the foregoing problems has been to employ self-lubricating bearings. Presently, self-lubricating bearings are of two general types: plastics modified with various lubricants and fillers, and soft, porous metals (such as bronze, lead, and aluminum) impregnated with oil. Oil impregnated metallic bearings are effective, but they are also expensive and are difficult to form into the desired shape.

Self-lubricating plastic bearing compositions are finding increasing applications. Depending upon the performance requirements of the bearing, a wide variety of plastic materials and compositions can be employed for bearing fabrication. For example, in light applications, such as small appliances and toys, unmodified conventional plastic materials, such as polycarbonates, polyethylene, polyacetal and nylon have been employed. As performance requirements become more demanding, nonmetallic bearing compositions have become more exotic. Presently, a wide variety of resin materials are modified with various fillers and reinforcements to provide greater wear resistance and load-bearing properties and to reduce friction. Nevertheless, the major applications for nonmetallic bearings have remained relatively low in performance requirements. Excellent bearing compositions have, however, been prepared from thermosetting and certain thermoplastic polyimide resins reinforced with glass fibers and containing certain lubricants. Typical compositions have load-bearing capacities approaching those of oil-impregnated metallic bearings. These compositions are available from Dupont, Wilmington, Del., U.S.A. under the trademark Vespel ®. These materials are relatively expensive and are not amenable to injection molding. Therefore, they must be machined to the desired shape, which contributes substantially to the cost of the finished product, and which also limits the possible physical configurations of the finished product.

There is a continuing need for high performance, nonmetallic bearing compositions which have excellent wear resistance and load-bearing capacities, and which can be fabricated into a wide variety of shapes by relatively simple injection molding techniques.

SUMMARY OF THE INVENTION

In accordance with the present invention, bearing compositions contain a polyetherimide resin as hereinafter defined and the following modifiers and reinforcements: (a) from about 1% to about 25% by weight of a fluoropolymer; (b) from about 1% to about 25% by weight of a lubricating agent selected from the group consisting of silicone fluid, molybdenum disulfide, graphite or a molybdenum disulfide containing solid lubricant, or any mixture thereof; and (c) from 0% to about 50% by weight of a reinforcing agent selected from the group consisting of glass fibers, carbon fibers and glass beads or mixtures thereof; wherein the above proportions are selected such that said bearing composition contains from about 35% to about 60% by weight polyetherimide resin and from about 40% to about 65% by weight fillers and reinforcements.

DETAILED DESCRIPTION OF THE INVENTION

The polyetherimides described herein are unique injection moldable thermoplastics, which are characterized by high impact strengths, high glass transition temperatures, and excellent processability. It is known that these resins can be reinforced with various materials, such as glass fibers, silica fillers, carbon whiskers, carbon fibers, and carbon powders to produce composites for structural applications. For example, see U.S. Pat. No. 3,803,085, U.S. Pat. No. 3,699,705 and U.S. Pat. No. 4,049,613. The nonmetallic bearing compositions of the present invention are novel polyetherimide composites which contain selected modifiers and reinforcements to provide wear resistance, load-bearing capacity and low coefficients of friction heretofore achieved only with metallic bearings or certain thermoset and thermoplastic polyimide resins.

The polyetherimides employed in the present invention are represented by the formula:

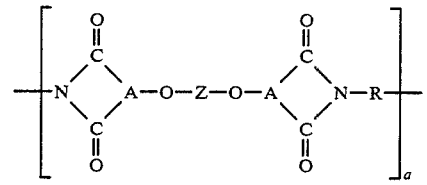

where "a" represents a whole number in excess of 1, e.g., 10 to 10,000 or more, the group —O—A is selected from:

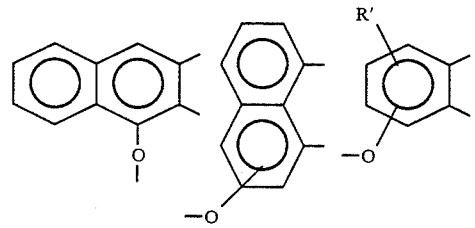

R' being hydrogen, lower alkyl or lower alkoxy, preferably the polyetherimide includes the latter —O—A group where R' is hydrogen such that the polyetherimide is of the formula:

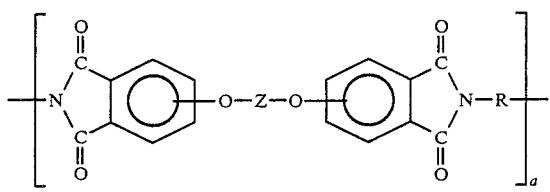

and the divalent bonds of the —O—Z—O-radical are in a 3,3'; 3,4'; 4,3' or the 4,4' position; Z is a member of the class consisting of (1)

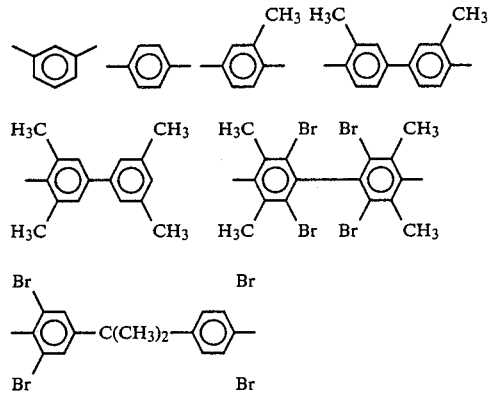

and (2) divalent organic radicals of the general formula:

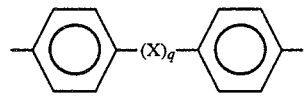

where X is a member selected from the class consisting of divalent radicals of the formulas,

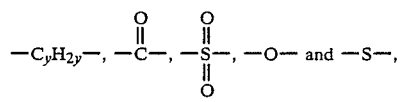

where q is 0 or 1, y is a whole number from 1 to 5, and R is a divalent organic radical selected from the class consisting of (1) aromatic hydrocarbon radicals having from 6–20 carbon atoms and halogenated derivatives thereof, (2) alkylene radicals and cycloalkylene radicals having from 2–20 carbon atoms, $C_{(2-8)}$ alkylene terminated polydiorganosiloxane, and (3) divalent radicals included by the formula

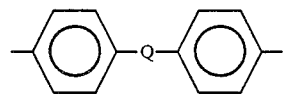

where Q is a member selected from the class consisting of

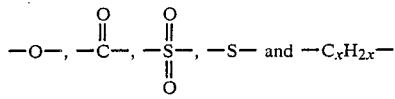

where x is a whole number from 1 to 5 inclusive. Particularly preferred polyetherimides for the purposes of the present invention include those where —O—A< and Z respectively are:

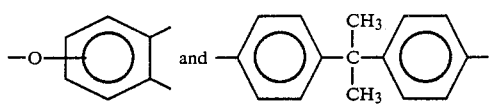

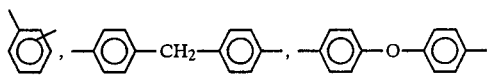

The polyetherimides where R is m-phenylene are most preferred.

Preferred polyetherimides have glass transition temperatures exceeding about 200° C., and most preferably exceeding about 215° C. High operating temperatures are the primary causes of failure of nonmetallic bearings, and those materials which can withstand high temperatures without distorting or decomposing are preferred.

The polyetherimides can be obtained by any of the methods well known to those skilled in the art including the reaction of any aromatic bis(ether anhydrides) of the formula

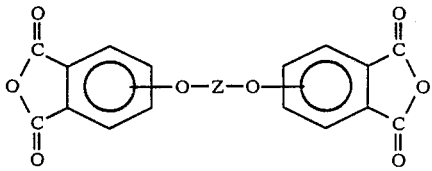

where Z is as defined hereinbefore with an organic diamine of the formula $H_2N$—R—$NH_2$ where R is as defined hereinbefore.

Aromatic bis(ether anhydride)s of the above formula include, for example, 2,2-bis[4-2,3-dicarboxyphenoxy)phenyl]propane dianhydride; 4,4'-bis(2,3-dicarboxyphenoxy)diphenyl ether dianhydride; 1,3-bis(2,3-dicarboxyphenoxy)benzene dianhydride; 4,4'-bis(2,3-dicarboxyphenoxy)diphenyl sulfide dianhydride; 1,4-bis(2,3-dicarboxyphenoxy)benzene dianhydride; 4,4'-bis(2,3-dicarboxyphenoxy)benzophenone dianhydride; 4,4'-bis(2,3-dicarboxyphenoxy)diphenyl sulfone dianhydride; etc., 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 1,3-bis(3,4-dicarboxyphenoxy)benzene dianhydride; 1,4-bis(3,4-dicarboxyphenoxy)benzene dianhydride; 4,4'-bis(3,4-dicarboxyphenoxy)benzophenone dianhydride; 4-(2,3-dicarboxyphenoxy)-4'-(3,4-dicarboxyphenoxy)diphenyl-2,2-propane dianhydride; etc., and mixtures of such dianhydrides.

In addition, aromatic bis(ether anhydride)s also included by the above formula are shown by Koton, M. M.; Florinski, F. S.; Bessonov, M. I.; Rudakov, A. P. (Institute of Heteroorganic Compounds, Academy of Sciences, U.S.S.R.), U.S.S.R. 257,010, Nov. 11, 1969, Appl. May 3, 1967. Also, dianhydrides are shown by M. M. Koton, F. S. Florinski, Zh Org. Khin, 4(5), 774 (1968).

Organic diamines of the above formula include, for example, m-phenylenediamine, p-phenylenediamine, 4,4'-diaminodiphenyl propane, 4,4'-diaminodiphenyl methane, benzidine, 4,4'-diaminodiphenyl sulfide, 4,4'-diaminodiphenyl sulfone, 4,4'-diaminodiphenyl ether, 1,5-diaminoaphthalene, 3,3'-dimethylbenzidine, 3,3'-dimethoxybenzidine, 2,4-bis(-amino-t-butyl)toluene, bis(p-β-amino-t-butylphenyl)ether, bis(p-methyl-o-aminophenyl)benzene, 1,3-diamino-4-isopropylbenzene, 1,2-bis(3-aminopropoxy)ethane, m-xylylenediamine, p-xylylenediamine, 2,4-diaminotoluene, 2,6-diaminotoluene, bis(4-aminocyclohexyl)methane, 3-methylheptamethylenediamine, 4,4-dimethylheptamethylenediamine, 2,11-dodecanediamine, 2,2-dimethylpropylenediamine, octamethylenediamine, 3-methoxyhexamethylenediamine, 2,5-dimethylhexamethylenediamine, 2,5-dimethylheptamethylenediamine, 3-methylheptamethylenediamine, 5-methylnonamethylenediamine, 1,4-cyclohexanediamine, 1,12-octadecanediamine, bis(3-aminopropyl)sulfide, N-methyl-bis(3-aminopropyl)amine, hexamethylenediamine, heptamethylenediamine, nonamethylenediamine, decamethylenediamine, bis(3-aminopropyl)tetramethyldisiloxane, bis(4-aminobutyl)tetramethyldisiloxane, etc.

In general, the reactions can be advantageously carried out employing well-known solvents, e.g., o-dichlorobenzene, m-cresol/toluene, etc., to effect interaction between the dianhydrides and the diamines, at temperatures of from about 100° to about 250° C. Alternatively, the polyetherimides can be prepared by melt polymerization of any of the aforementioned dianhydrides with any of the aforementioned diamine compounds while heating the mixture of the ingredients at elevated temperatures with concurrent intermixing. Generally, melt polymerization temperatures between about 200° to 400° C. and preferably 230° to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance. In general, equimolar amounts of diamine and dianhydride are employed for high molecular weight polyetherimides, however, in certain instances, a slight molar excess (about 1 to 5 mol percent) of diamine can be employed resulting in the production of polyetherimides having terminal amine groups. Generally, useful polyetherimides have an intrinsic viscosity [η] greater than 0.2 deciliters per gram, preferably 0.35 to 0.60, or 0.7 deciliters per gram or even higher when measured in m-cresol at 25° C.

Included among the many methods of making the polyetherimides are those disclosed in U.S. Pat. Nos. Heath et al., 3,847,867, Williams 3,847,869, Takekoshi et al. 3,850,885, White 3,852,242 and 3,855,178. These disclosures are incorporated herein in their entirety by reference for the purpose of teaching, by way of illustration, general and specific methods for preparing polyetherimides suitable for the composites of this invention.

Particularly preferred polyetherimides for the compositions of the present invention are represented by the formula

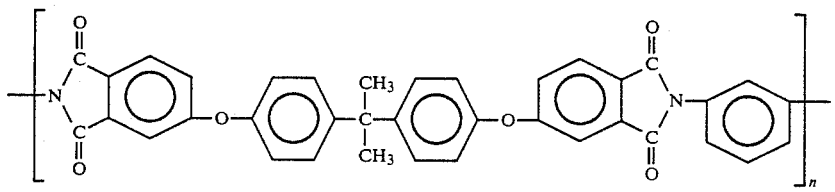

wherein "n" is an integer ranging from about 10 to about 100. This material is commercially available from General Electric Company, Pittsfield, Mass. under the registered trademark, ULTEM ®.

Although unmodified polyetherimide resins can be used for the fabrication of bearings for certain low performance applications, the characteristics of the material can be greatly improved by the addition of certain modifiers and reinforcements. These modifiers and reinforcements serve to reduce the coefficient of friction between the bearing and the mating surface (e.g. a shaft) and to reduce the rate of wear of the bearing.

One type of material which serves both of these functions is flupopolymer, such as polytetrafluoroethylene ("PTFE") fluorinated ethylene-propylene ("FEP"), and perfluoroalkoxy ("PFA"). These polymers are available commercially in powdered form and can conveniently be incorporated into the bearing compositions of the present invention. They are known for their ability to reduce friction between moving parts, and in the present compositions, they tend to reduce the wear rate not only of the nonmetallic bearing but also of the opposing surface, which is usually metallic. The fluoropolymer employed in the present compositions is generally in powdered form, and has a particle size ranging from about 1 to about 25 microns, preferably from about 5 to about 10 microns. A particularly preferred fluoropolymer is PTFE which is available from Allied Chemical Corporation, Morristown, N.J. under the trademark Polymist ®F. The fluoropolymer is generally employed in a concentration of from about 1% to about 25% by wt. Concentrations greater than about 25% do not appreciably improve the properties of the composition, and can even have a deleterious effect on the strength and load bearing capacity of bearings fabricated from the composition. On the other hand, concentrations lower than about 1% by wt. are generally ineffective in providing the desired characteristics to the compositions. Preferred concentrations of fluoropolymer range from about 5% by wt. to about 20% by wt., most preferably about 15% by wt. of the composition.

In addition to a fluoropolymer, the compositions also include a lubricant for significantly reducing the coefficient of friction between the bearing and the opposing surface. Such lubricants are generally selected from three classes of materials or mixtures thereof. The first class of lubricants are molybdenum disulfide or special formulations of molybdenum disulfide-containing materials. The second class of solid lubricant is graphite, and the third class is silicone fluid. Whatever the lubricant, it is advantageously employed as a finely divided powder or a liquid in the case of silicone fluids. Generally, the particle size is smaller than about 200 mesh, preferably smaller than about 300 mesh (note: mesh size refers to the ability to pass through a standard Tyler mesh screen). Both graphite and molybdenum disulfide are commercially available as powders having the desired particle sizes. In addition, special formulations of molybdenum disulfide are available. A particularly preferred solid lubricant is available from Dow Corning Corporation, Midland, Mich. under the trademark Lubolid ®. The concentration of the solid lubricant in the bearing compositions of the present invention can vary depending on the particular material used. Generally, such concentrations range from about 1% by weight to about 25% by weight of the total composition. For molybdenum disulfide or molybdenum disulfide-containing lubricants, preferred concentrations range from about 1% to about 15% by wt., most preferably about 2.5% by wt. Graphite lubricants are preferably employed in concentrations ranging from about 5% by wt. to about 20% by wt., most preferably about 20% by wt. Mixtures of these materials can also be used, provided that the total amount of solid lubricant falls within the desired ranges.

The third class of lubricants is comprised of fluids based on polysiloxane, and are particularly effective when used in conjunction with PTFE. Loadings are generally quite low, on the order of about 1 to about 5% by wt. of the total composition.

The present compositions also employ a reinforcing agent, whose function is to reduce the rate of wear of nonmetallic bearings fabricated from the compositions. The reinforcing material is selected from the group consisting of glass fibers, carbon fibers, and glass beads. These materials are well known in resins art, and the first two are widely used as reinforcements for structural materials. Bearing compositions for lower performance applications can be obtained without using a reinforcing material; however, the strength and durability of the composite is substantially improved by including such materials. Glass fibers are the most common reinforcing agents, and are preferred for the compositions of the present invention because of their low cost and the desirable properties they impart to the compositions. The glass fibers employed in this composition are generally so-called "chopped" strands which contain strands having average lengths from about 3 to about 6 mm. Longer strands tend to increase the abrasiveness of the composites whereas shorter strands do not impart the desired strength to the composite. Preferred glass fibers have average strand lengths of approximately 3 mm. In addition, the strands are advantageously relatively fine, and have diameters ranging from about 5 to about 15 microns, preferably about 10 microns.

Carbon fibers are employed for the production of extremely tough and durable resin composites. Such composites are finding a wide variety of applications ranging from sporting goods to aerospace. The cost of carbon fibers is presently considerably higher than that of glass fibers, therefore, generally their use would be limited to those applications where their superior properties outweigh the higher costs. The carbon fibers employed in the compositions have strand lengths generally ranging from about 0.4 mm to about 6 mm and diameters ranging from about 5 to about 25 microns. Carbon fibers presently available are produced either by the so called "pitch" or "PAN" methods. Fibers made by either of these procedures can be employed in the present compositions; however, fibers made by the pitch method have been found superior and are preferred for the present invention.

Glass beads can also be used as reinforcing materials and can be substituted in whole or in part for glass or carbon fibers. Glass beads are also commercially available in a wide range of particle sizes, and those beads having particle sizes ranging from about 1 to about 55 microns are generally employed. Preferred glass beads have particle sizes ranging from about 5 to about 45 microns.

The total amount of reinforcing material used in the present compositions can range from zero to about 50% by wt. of the total composition. The upper concentration limit for the reinforcing materials is to a large part determined by the abrasiveness of the resulting composite. These materials, particularly fibers, can be quite abrasive, and this abrasiveness can result in substantial wear of the surface which mates with a nonmetallic bearing. Preferred concentrations for glass fibers range from about 5% by wt. to about 40% by wt. of the composition and preferably are about 25% by wt. of the composition. Preferred ranges for carbon fibers range from about 5% by wt. to about 30% by wt. with a preferred concentration of about 10% by wt. of the composition. Preferred ranges for glass beads range from about 5% by wt. to about 40% by wt. with a particularly preferred concentration of about 20% by wt. of the composition.

It will be appreciated by those skilled in the art that the concentrations of the various fillers and reinforcements described above will be selected to obtain a composition having the desired characteristics for the particular application envisaged. In general, the proportions are selected such that the final bearing compositions contain from about 35% by wt. to about 60% by wt. of the polyetherimide resin and from about 40% by wt. to about 65% by wt. of fillers and reinforcements.

The bearing compositions of this invention have generally been found to have good wear resistance and load-bearing capacities, have a low coefficient of friction and produce very little wear on other moving parts. The compositions can be prepared by any suitable blending technique which results in intimate mixing of the resin, the fillers and the reinforcements. This mixing can advantageously be accomplished in an extrusion apparatus which is maintained at a temperature higher than the glass transition temperature of the polyetherimide resin being employed, e.g., from about 250° to about 400° C. Generally, the pelletized or powdered resin material is mixed with the other dry ingredients and/or silicone fluids and fed into the hopper of such an extrusion apparatus. The resin is melted in the extrusion apparatus and intimately mixed with the other components and is then extruded through a die, air cooled and chopped to form a pelletized bearing composition.

A particular advantage of the compositions of the present invention is that they can be injection molded to a variety of different shapes. Injection molding is considerably less expensive than machining and also permits greater flexibility in designing the shape of the finished product. These compositions can be molded into relatively thin-walled structures resulting in economies in not only raw material costs but also of space and weight. Perhaps more importantly, the thin-walled constructions result in greater heat dissipation, which can improve the performance of the bearing.

The characteristics of the various compositions of the present invention are generally determined by certain standardized tests. One of these tests measures the "PV limit" of a bearing material. In this test, a bearing (generally a thrust washer) is placed in contact with a polished steel surface which rotates a constant velocity. The force between the steel surface and the bearing is gradually increased in a stepwise manner, and conditions are allowed to stabilize after each step. The maximum force which results in no distortion of the bearing is multiplied times the velocity and this figure is used as a measure of the allowable operating limits of the composition. Another test for these compositions is the wear rate. Again, a thrust washer fabricated from the composition being tested is mounted on a rotating holder and is pressed against a steel surface. The steel surface is mounted on an antifriction bearing equipped with a torque arm. Bearing temperature and friction torque are continuously monitored. After a break-in period (usually about 40 hours) the plastic washer is removed and weighed to four place accuracy. Subsequent wear is reported as milligrams per hour at specified speed and load.

The present invention is illustrated by the following examples, which are not intended to be limiting. "PV limits" "wear rates" and "coefficients of friction" are determined by the foregoing procedures. In addition, the condition of the steel surface which engages the bearing was also noted as an indication of the abrasiveness of the bearing composition being tested.

EXAMPLES I-XXIII

Several compositions were prepared by blending polyetherimide resin of the formula

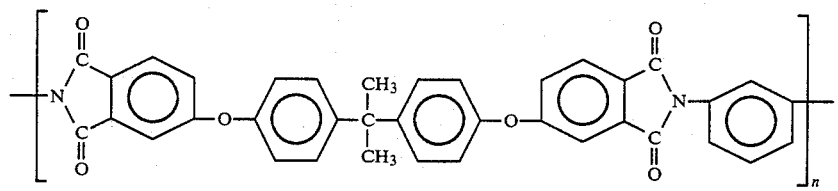

wherein n averages from about 10 to about 100, with the various fillers and reinforcements indicated in Table 1.

The compositions were prepared by melt blending the ingredients in an extrusion apparatus at a temperature of 350° C. The resulting composition was extruded, air-cooled and chopped into pellets. These pellets were then injection molded into ⅛ inch thick plaques. Samples for testing were machined from the plaques without modifying the molded testing surface. All samples were cleaned with hexane prior to testing. For the PV limit, wear rate, and coefficient of friction tests, a thrust washer tester designated LFW-6 and manufactured by Faville-LaValley Corporation was employed. The sample thrust washer was machined to a size of 1⅛ inch outside diameter and a contact area of 0.4 in$^2$. The thrust washer was mounted on a rotating holder and pressed against a dry, cold rolled, carbon steel wear ring with specified hardness and finish. The steel ring was mounted on an anti-friction bearing equipped with a torque arm. Bearing temperature and friction torque were continuously monitored. After break-in (about 40 hours), the plastic washer was removed and weighed to four place accuracy. Subsequent wear was reported as milligrams per hour at specified speed and load. A separate plastic specimen was used to determine the PV limit. At a sliding speed of 100 feet/min., load was increased in a stepwise manner and conditions were allowed to stabilize at each point. The pressure at which stabilization occurred was defined as the PV limit and was reported as the product of speed and the highest usable load. The results of these tests for the various compositions are reported in Table 1 below. For comparison purposes, the unmodified polyetherimide resin was tested as well as several compositions containing less than all of the components of the compositions of the invention described herein. The results shown in Table 1 demonstrate that the bearing compositions of this invention can be injected molded to provide bearings having excellent frictional, wear resistance, and load-bearing capabilities. Unless otherwise indicated, the graphite, Lubolid and MoS$_2$ had particle sizes of 200–300 mesh. The glass fiber was silane-treated and chopped to average strand lengths of about 3 mm with average strand diameters of about 10 microns. Glass beads had average particle sizes of 1-53 microns.

TABLE I

| Example No. | Carbon Fiber (PAN) wt. % | Carbon Fiber (Pitch) wt. % | Graphite wt. % | PTFE wt. % | Glass Fibers wt. % | Glass Beads wt. & | Lubolid ® wt. % | MoS$_2$ wt. % | Coefficient of Friction | Wear @ PV = 2000 (mg/hr) | PV limit @ 100 ft/min (M psi·fpm) | Steel Condition * |
|---|---|---|---|---|---|---|---|---|---|---|---|---|
| I | | | | | | | | | 0.16 | 10.0 | 10 | S |
| II | 17 | | | | | | | | 0.12 | 0.28 | 13.5 | S |
| III | | 17 | | | | | | | 0.11 | 0.18 | 12.5 | S |
| IV | | | 17 | | | | | | 0.11 | 4.6 | 12.5 | W |
| V | | | | 11 | 15 | | | | 0.11 | 0.63 | 45 | S |
| VI | | | 11 | | 11 | | 2 | | 0.11 | 0.15 | 55 | OK |
| VII | | | | 13 | | | | | 0.12 | 1.0 | 45 | S |
| VIII | 16 | | | 4 | | | | | 0.14 | 0.3 | 30 | S |
| IX | | | 6 | | | | | 16 | 0.15 | 2.3 | 17.5 | OK |
| X | | | | 12 | | | | 8 | 0.11 | 0.6 | 52.5 | OK |
| XI | | | 9 | | | | 3 | | 0.13 | 2.0 | 12.5 | OK |
| XII | | | 10 | 3 | | | | | 0.12 | 0.75 | 14 | OK |

TABLE I-continued

| Example No. | Carbon Fiber (PAN) wt. % | Carbon Fiber (Pitch) wt. % | Graphite wt. % | PTFF wt. % | Glass Fibers wt. % | Glass Beads wt. & | Lubolid ® wt. % | MoS₂ wt. % | Coefficient of Friction | Wear @ PV = 2000 (mg/hr) | PV limit @ 100 ft/min (M psi·fpm) | Steel Condition * |
|---|---|---|---|---|---|---|---|---|---|---|---|---|
| XIII | | 10 | | | | | | | 0.14 | 0.7 | 45 | W |
| XIV | | | | 15** | | | | | 0.12 | 0.5 | 42 | OK |
| XV | | | 10 | 5** | 20 | | | | 0.13 | 0.06 | 55 | S |
| XVI | | | | 15** | 25 | | | | 0.14 | .015 | 37.5 | OK |
| XVII | | | 10 | | 20 | | | | 0.13 | 0.12 | 50 | W |
| XVIII | | | 10 | 8** | 20 | | 2 | | 0.12 | 0.02 | 70 | OK |
| XIX | | | 10 | 15** | 20 | | | | 0.13 | 0.063 | 60 | OK |
| XX | | | 10 | | 20 | | | 2.5 | 0.12 | 0.052 | 95 | OK |
| XXI | | | 10 | | | 20 | | 2.5 | 0.13 | 0.063 | 88 | OK |
| XXII | | | 10 | 15** | 25 | | | 2.5 | 0.12 | 0.06 | 55 | OK |
| XXIII | | | | 15** | | | | | 0.12 | 0.077 | | OK |

*S = scratched
W = worn
OK = smooth or polished
**Allied Polymist ® F-S (all others Dupont SX6000)

I claim:
1. A bearing composition which comprises a polyetherimide resin of the formula:

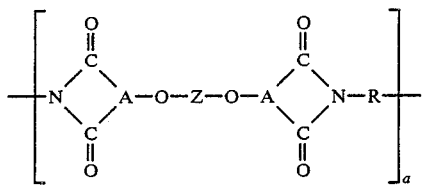

and the following modifiers and reinforcements: (a) from about 1% to about 25% by wt. of a fluoropolymer; (b) from about 1% to about 25% by wt. of a lubricating agent selected from the group consisting of silicone fluid, a molybdenum disulfide, graphite or a molybdenum disulfide-containing solid lubricant, or any mixture thereof; and (c) from 0% to about 50% of a reinforcing agent selected from the group consisting of glass fibers, carbon fibers, glass beads and mixtures thereof; wherein the above proportions are selected such that said bearing compositions contain from about 35% by wt. to about 60% by wt. polyetherimide resin and from about 40% by wt. to about 65% by wt. modifiers and reinforcements; wherein "a" represents a whole number from about 10 to about 10,000, the group —O—A< is selected from:

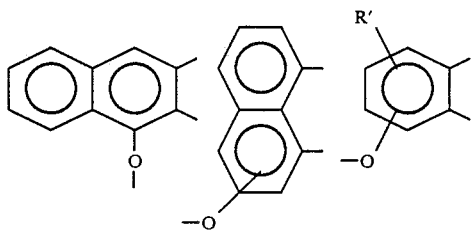

wherein R' is hydrogen, lower alkyl or lower alkoxy; Z is a member of the class consisting of (1)

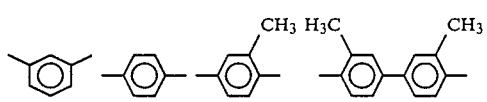

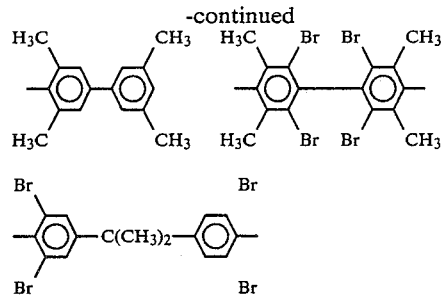

and (2) divalent organic radicals of the general formula

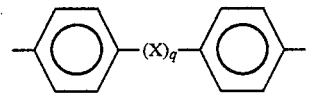

where X is a member selected from the class consisting of divalent radicals of the formula:

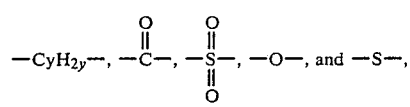

where q is 0 or 1, y is a whole number from 1 to 5 and R is a divalent organic radical selected from the class consisting of (1) aromatic hydrocarbon radicals having from 6 to 20 carbon atoms and halogenated derivatives thereof, (2) alkylene radicals and cycloalkylene radicals having from 2-20 carbon atoms, C₍₂₋₈₎ alkylene terminated polydiorganosiloxane, and (3) divalent radicals of the formula

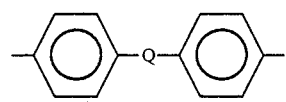

where Q is a member selected from the class consisting of

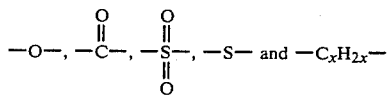

where x is a whole number from 1 to 5 inclusive.

2. The bearing composition of claim 1, wherein the group —O—A< is

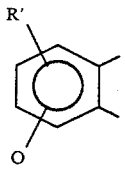

3. The bearing composition of claim 2, wherein Z is

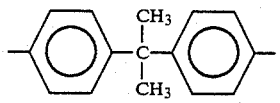

and R is

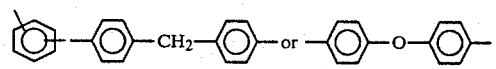

4. The bearing composition of claim 1, wherein the polyetherimide resin has the formula

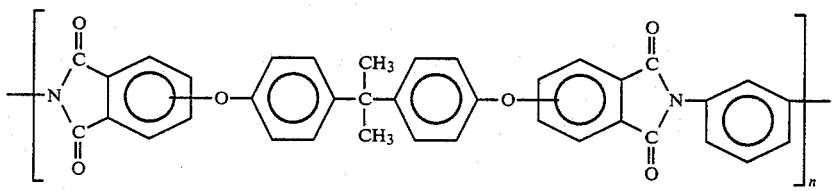

wherein n is an integer from 10 to about 100.

5. The bearing composition of claim 1, 2, 3, or 4 wherein the polyetherimide resin has a glass transition temperature of at least about 200° C., the fluoropolymer is polytetrafluoroethylene, has a particle size from about 1 to about 25 microns, and is present at a concentration of from about 5% by wt. to about 20% by wt. of the composition.

6. The bearing composition of claim 5, wherein the lubricating agent is molybdenum disulfide or a molybdenum disulfide-containing lubricant and is present at a concentration of from about 1% by wt. to about 15% by wt. of the composition.

7. The bearing composition of claim 5, wherein the lubricating agent is silicone fluid and is present at a concentration of about 1% by wt. to about 5% by wt. of the composition.

8. The bearing composition of claim 5, wherein the lubricating agent is graphite and is present at a concentration of from about 5% by wt. to about 20% by wt. of the composition.

9. The bearing composition of claim 6, wherein the reinforcing agent is glass fiber having chopped strands with average lengths from about 3 mm to about 6 mm and average diameters of from about 5 microns to about 15 microns, wherein said glass fiber is present at a concentration from about 5% by wt. to about 40% by wt. of the composition.

10. The bearing composition of claim 6, wherein the reinforcing agent is carbon fiber having strands of average lengths from about 0.4 mm to about 6 mm and average diameters of from about 5 microns to about 25 microns, wherein said carbon fiber is present at a concentration from about 5% by wt. to about 30% by wt. of the composition.

11. The bearing composition of claim 6, wherein the reinforcing agent contains glass beads having an average particle size of from about 1 to about 53 microns, and wherein said glass beads are present at a concentration of from about 5% by wt. to about 40% by wt. of the composition.

12. The bearing composition of claim 8, wherein the polyetherimide resin has a glass transition temperature of at least about 215° C.

13. The bearing composition of claim 4, wherein the polytetrafluoroethylene has a particle size of from 5 to about 10 microns and is present at a concentration of about 15% by wt. of the composition; the lubricating agent is a combination of molybdenum disulfide having a particle size from about 200 to about 300 mesh, present at a concentration of about 2.5% by wt. of the composition, and graphite having a particle size from about 200 to about 300 mesh, present at a concentration of about 10% by wt. of the composition; the reinforcing agent is silane-treated glass fiber having chopped strands with average lengths about 3 mm and average diameters of about 10 microns and is present at a concentration of about 25% by wt. of the composition.

14. A method for forming a nonmetallic bearing which comprises injection molding the composition of claim 1, 2, 3, 4 or 13 to the desired shape.

15. A nonmetallic bearing formed from the composition of claim 1, 2, 3, 4 or 13.

* * * * *

UNITED STATES PATENT AND TRADEMARK OFFICE
CERTIFICATE OF CORRECTION

PATENT NO. : 4,532,054

DATED : July 30, 1985

INVENTOR(S) : Johnson

It is certified that error appears in the above-identified patent and that said Letters Patent is hereby corrected as shown below:

Column 2, line 33, "3,699,705" should be --3,699,075--.

Signed and Sealed this
Ninth Day of December, 1986

*Attest:*

DONALD J. QUIGG

*Attesting Officer*   *Commissioner of Patents and Trademarks*